US008825004B2

(12) United States Patent
Hellgren

(10) Patent No.: US 8,825,004 B2
(45) Date of Patent: Sep. 2, 2014

(54) METHODS, APPARATUSES, SYSTEM AND RELATED COMPUTER PROGRAM PRODUCT FOR CHARGING OF ALWAYS-ON CONNECTIONS

(75) Inventor: Vesa Pauli Hellgren, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 202 days.

(21) Appl. No.: 13/130,142

(22) PCT Filed: Nov. 19, 2008

(86) PCT No.: PCT/EP2008/065792
§ 371 (c)(1),
(2), (4) Date: May 19, 2011

(87) PCT Pub. No.: WO2010/057524
PCT Pub. Date: May 27, 2010

(65) Prior Publication Data
US 2011/0223882 A1 Sep. 15, 2011

(51) Int. Cl.
*H04W 4/24* (2009.01)
(52) U.S. Cl.
USPC .......................................... 455/406; 455/528
(58) Field of Classification Search
USPC .............. 455/446, 556.2, 566, 567, 406, 528; 348/12
See application file for complete search history.

(56) References Cited

U.S. PATENT DOCUMENTS

| 2001/0034711 | A1* | 10/2001 | Tashenberg | 705/52 |
| 2003/0189660 | A1* | 10/2003 | Ishida et al. | 348/312 |
| 2009/0068981 | A1 | 3/2009 | Hurtta et al. | |
| 2010/0202602 | A1* | 8/2010 | Noldus et al. | 379/201.01 |

FOREIGN PATENT DOCUMENTS

| CN | 101009571 A | 8/2007 |
| CN | 101237327 A | 8/2008 |
| WO | 0139483 A2 | 5/2001 |

OTHER PUBLICATIONS

3GPP TS 32.251 V8.3.0 (Sep. 2008): "Technical Specification 3rd Generation Partnership Project; Technical Specification Group Services and System Aspects", Telecommunication Management; Charging Management; Packet Switched (PS) Domain Charging (Release 8).
3GPP TS 32.298 V8.2.0 (Jun. 2008): "Technical Specification 3rd Generation Partnership Project; Technical Specification Group Service and System Aspects", Telecommunication Management, Charging Management; Charging Data Record (CDR) Parameter Description (Release 8).

(Continued)

*Primary Examiner* — Sam Bhattacharya
(74) *Attorney, Agent, or Firm* — Laurence A. Greenberg; Werner H. Stemer; Ralph E. Locher

(57) ABSTRACT

The generation of charging data and charging traffic is reduced during idle periods of an always-on connection. During the detection of idle periods on the always-on connection special data like ICMP messages, keep alive messages and polling messages is ignored and not counted as active traffic. When an idle period is detected the charging session related to the always-on connection is suspended for the duration of the idle period in order to reduce the generation of charging data related to the idle always-on connection without terminating the charging session. Further on the user is not billed for the detected periods where the always-on connection was idle.

22 Claims, 10 Drawing Sheets

(56) References Cited

OTHER PUBLICATIONS

SA2: "LS on CDR Creation for Non-Charging Liable Subscriptions", NP-99469, 3GPP Draft; NP-99469, 3rd Generation Partnership Project (3GPP), Mobile Competence Centre, 650, Route des Lucioles, F-06921 Sophia-Antipolis Cedex, France, vol. TSG CN, no. Nice, France, 19991213, Dec. 13, 1999, XP050046202 [retrieved on Dec. 14, 1999] the whole document.

* cited by examiner

METHODS, APPARATUSES, SYSTEM AND RELATED COMPUTER PROGRAM PRODUCT FOR CHARGING OF ALWAYS-ON CONNECTIONS

FIELD OF THE INVENTION

The present invention relates to the field of charging. More specifically, the present invention relates to methods, apparatuses, a system and a related computer program product for charging of always-on connections. Examples of the present invention may be applicable to offline and online charging schemes of data networks like for example General Packet Radio Service (GPRS), Universal Mobile Telecommunications System (UMTS), Wireless Local Area Network (WLAN) and Long Term Evolution (LTE)/System Architecture Evolution (SAE) and any other kind of mobile and fixed data networks.

BACKGROUND

Due to the growing use of new end devices (like for example Smart phones) and more sophisticated applications running on those devices, the usage of data networks is currently increasing, especially in the area of mobile data networks. Subscribes start to use data services more frequently and for longer time intervals. Some of the applications running for example on Smart phones work in a similar way like applications for the fixed networks where data connections are always-on.

The changed subscriber behavior leads to changes in the pricing models offered by network operators, especially mobile network operators. Earlier dominating time and volume based tariffs do not fit to the changing subscriber needs anymore. Network operators are starting to offer flat-rate data subscriptions in a bigger scale allowing the subscribers to stay with their devices "always-on". Always-on on connections are characterized by long periods where the connection is idle, traffic occurs only occasionally.

But flat-rate data subscriptions do not fit very well with the way how charging is implemented for example in mobile data networks today. Charging is optimized for short-lived sessions that are only active when there is user traffic. It was expected that longer idle periods occur only very rarely. As a result the subscribers will be charged for the whole time where a connection exists, even for the time where the connection is idle.

Charging is implemented based on Charging Data Records (CDRs) which include information about the connection to be charged. This kind of information can be for example connection starting and ending times, duration of a connection, used services, amount of transferred data, used Quality of Service (QoS), etc. . . . CDRs are generated frequently during the life time of a connection and are forwarded to the Billing Domain (BD). Even if a connection is idle for a longer time period (like for example in the case of always-on connections) CDRs are generated frequently and forwarded to the billing domain.

Due to the increasing offering of flat-rate subscriptions the amount of always-on connections grows rapidly, thus an increasing amount of connections starts to be idle for longer time periods. This leads to the situation that more and more CDRs are generated (due to the always-on connections using the present charging implementation which causes frequent CDR generation even if the connection is idle), resulting in an increased network load for transferring all those CDRs to the billing system. In addition network operators (for example Internet Service Providers (ISPs)) are nowadays forced by law to store connection related information for all their subscribers for a certain period of time. The more CDRs are generated per subscriber the more data must be stored.

If for example CDRs for each single connection are generated every 10 minutes, even if the connections are idle and there is nothing to report, this would mean for a large operator with about 10 Million idle connections all the time, 1.440 Million unnecessary CDRs per day loading the network of the operator and consuming storage capacity.

In consideration of the above, it is an object of the present invention to overcome one or more of the above drawbacks. In particular, the present invention provides methods, apparatuses, a system and a related computer program product for optimizing charging related traffic for always-on connections.

According to an example of the present invention, in a first aspect, this object is for example achieved by a method comprising:

detecting if the always-on connection is idle and
suspending a charging session related to the always-on connection if the always-on connection is idle without terminating the charging session.

According to further refinements of the example of the present invention as defined under the above first aspect, the method further comprises the suspending is done by reducing the generation of charging data for the always-on connection during the detected idle period.

reducing the generation of charging data for the always-on connection during the detected idle period suppressing of at least one charging trigger causing the generation of Charging Data Records (CDRs) related data.

the reducing comprises suppressing of at least one charging trigger causing the generation of Charging Data Records (CDRs) related data.

wherein the at least one charging trigger is at least one of a Quality of Service (QoS) change, Tariff time change, Cell Global Identifier (CGI) change, Service Area Identifier (SAI) change, Routing Area Identity (RAI) change and Packet data Protocol (PDP) context modification.

closing the currently open Charging Data Record (CDR) and not opening a new Charging Data Record (CDR) for the charging session related to the always-on connection when a start of the idle period is detected.

the suppressing results in closing the currently open Charging Data Record (CDR) and not opening a new Charging Data Record (CDR) for the charging session related to the always-on connection when a start of the idle period is detected.

if the suspending of the charging session starts generating an indication including at least one of a charging session suspended information, a time-stamp when the suspending of the charging session is started and a time-stamp when the always-on connection became idle.

if the suspending of the charging session ends generating an indication including at least one of charging session continued information and a time-stamp when the continuation of the charging session is started.

coding indications generated when the suspending of a charging session is started or when the continuation of the charging session is started in at least one Charging Data Record (CDR), wherein the indications are coded in at least one of a Charging Data Record (CDR) specific fields (for example "Record opening time", "Cause for record opening", "Record closing time", "Cause for record closing", ... )
and a Container specific fields (for example "Change
time", "Change condition", ... ) where the container is
included in the Charging Data Record (CDR).
wherein the charging session is one of an offline charging
session and an online charging session.
wherein the charging is related to connections in a mobile
radio network.

According to further refinements of the example of the present invention as defined under the above first aspect, the method further comprises
checking that no data is present on the always-on connection for a defined time period and ignoring during the checking special data present on the always-on connection,
that the detecting if the always-on connection is idle comprises checking that no data is present on the always-on connection for a defined time period and ignoring during the checking special data present on the always-on connection,
wherein the special data is data related to monitoring and controlling of the always-on connection or data related to monitoring and controlling of applications running over the always-on connection,
wherein the special data is at least one of ICMP messages, keep-alive messages and polling messages.
the method further comprises that the data on the always-on connection is user plane data transferred over a Packet Data Protocol (PDP) context.

According to an example of the present invention, in a second aspect, this object is for example achieved by a method comprising:
extracting information from received charging data related to the always-on connection
detecting from the extracted information if a charging session related to the always-on connection is suspended.

According to further refinements of the example of the present invention as defined under the above second aspect,
the extracted information includes at least one of an indication if the charging session is suspended, a time-stamp when the suspending of the charging session is started, a time-stamp when the always-on connection related to the charging session became idle, an indication when the charging session is continued and a time-stamp when the continuation of the charging session related to the always-on connection is started.
wherein the time-stamp information is used to calculate time periods for at least one of a period where the always-on connection was idle and a time period where the charging session related to the always-on connection was suspended.
wherein the extracted information is used to calculate time periods for at least one of a time period where the always-on connection was idle and a time period where the charging session related to the always-on connection was suspended.
wherein the calculated time periods are not billed to the user of the always-on connection.
wherein the information is extracted from received Charge Data Records (CDRs).
wherein the information is extracted from at least one of a Charging Data Record (CDR) specific fields (for example "Record opening time", "Cause for record opening", "Record closing time", "Cause for record closing", ... ) and a Container specific fields (for example "Change time", "Change condition", ... ) where the container is included in the Charging Data Record (CDR).
wherein the charging session is one of an offline charging session and an online charging session.
wherein the charging is related to connections in a mobile radio network.

According to an example of the present invention, in a third aspect, this object is for example achieved by an apparatus comprising:
means for detecting if the always-on connection is idle.
means for suspending a charging session related to the always-on connection if the always-on connection is idle without terminating the charging session.

According to further refinements of the example of the present invention as defined under the above third aspect,
the means for suspending initiates the reduction of charging data generated for the always-on connection during the detected idle period.
the reduction of charging data comprises suppressing of at least one charging trigger causing the generation of Charging Data Records (CDR) related data.
the at least one charging trigger is at least one of a Quality of Service (QoS) change, Tariff time change, Cell Global Identifier (CGI) change, Service Area Identifier (SAI) change, Routing Area Identity (RAI) change and Packet data Protocol (PDP) context modification.
the means for suspending initiating a closing of an open Charging Data Record (CDR) without opening a new Charging Data Record CDR for the always-on connection when a start of the idle period is detected.
if the suspending of the charging session starts an indication is generated including at least one of a charging session suspended information, a time-stamp when the suspending of the charging session is started and a time-stamp information when the always-on connection became idle.
if the suspending of the charging session ends an indication is generated including at least one of a charging session continued information and a time-stamp when the continuation of the charging session is started.
wherein the indications are generated in the Charging Trigger function (CTF).
the indications are coded in at least one Charging Data Record (CDR).
the indications are coded in at least one Charging Data Record (CDR) in a Charging Data Function.
the indications are coded in at least one of a Charging Data Record (CDR) specific fields (for example "Record opening time", "Cause for record opening", "Record closing time", "Cause for record closing", ... ) and a Container specific fields (for example "Change time", "Change condition", ... ) where the container is included in the Charging Data Record (CDR).
the coding is done in a Charging Data Function (CDF).

According to further refinements of the example of the present invention as defined under the above third aspect,
the means for detecting if the always-on connection is idle detects that the always-on connection is idle by checking that no data on the always-on connection is present for a defined time period and by ignoring special data related to the always-on connection, where the special data is data related to monitoring and controlling of the always-on connection or data related to monitoring and controlling of applications running over the always-on connection.

the special data is at least one of ICMP messages, keep-alive messages and polling messages.

the data related to the always-on connection is user plane data transferred over a Packet Data Protocol (PDP) context.

the data on the always-on connection is user plane data transferred over a Packet Data Protocol (PDP) context.

According to further refinements of the example of the present invention as defined under the above third aspect, the device constitutes one of a Gateway General Packet Radio Service Support Node (GGSN), Serving General Packet Radio Service Support Node (SGSN), Media Gateway (MGW), Packet Data Gateway (PDG), Packet Data Switching Node (PDSN), Packet Data Network Gateway (PGW), Serving Gateway (SGW) and Broadband Remote Access Server (BRAS),/Broadband Network Gateway (BNG), Access Service Network Gateway (ASNGW)

the charging session is one of an offline charging session and an online charging session.

the charging is related to connections in a mobile radio network.

According to an example of the present invention, in a fourth aspect, this object is for example achieved by an apparatus comprising:

means for extracting information from received charging data related to the always-on connection means for detecting from the extracted information if a charging session related to the always-on connection is suspended.

According to further refinements of the example of the present invention as defined under the above fourth aspect, the extracted information includes at least one of an indication if the charging session is suspended, a time-stamp when the suspending of the charging session is started, a time-stamp when the always-on connection related to the charging session became idle, an indication if the charging session is continued and a time-stamp when the continuation of the charging session related to the always-on connection is started.

the means for extracting information extracts the information from received Charging Data Records (CDR).

the information is extracted from at least one of a Charging Data Record (CDR) specific fields (for example "Record opening time", "Cause for record opening", "Record closing time", "Cause for record closing", . . . ) and a Container specific fields (for example "Change time", "Change condition", . . . ) where the container is included in the Charging Data Record (CDR).

the device further comprises a means for calculating from the extracted information at least one of a time period where the always-on connection was idle and a time period where the charging session related to the always-on connection was suspended.

the device further comprises a means for billing not billing the user of the always-on connection for at least one of the calculated time periods.

the device constitutes a Billing Support System (BSS).

the charging session is one of an offline charging session and an online charging session.

the charging is related to connections in a mobile radio network.

According to an example of the present invention, in a fifth aspect, this object is for example achieved by a system for suspending a charging session of an always-on connection comprising:

an apparatus according to the above third aspects and
an apparatus according to the above fourth aspect.

According to an example of the present invention, in an sixth aspect, this object is for example achieved by a computer program product comprising code means for suspending a charging session of an always-on connection adapted to produce the steps of a method according to any one of the above first and second aspects, when run on a processing means or module.

BRIEF DESCRIPTION OF THE DRAWINGS

Examples of the present invention are described herein below with reference to the accompanying drawings, in which.

DETAILED DESCRIPTION OF THE PRESENT INVENTION

Examples of the present invention are described herein below with reference to the accompanying drawings.

It is to be noted that for this description, the terms "Charging Trigger Function (CTF), Charging Data Function (CDF), Charging Gateway Function (CGF), Charging Data Record (CDR), Online Charging System (OCS), Billing Support System (BSS) and User Equipment (UE)" are examples for charging functions and network elements in a network and billing domain without restricting or limiting them to functions or elements in a system specified by for example specific standardization bodies like 3GPP or to special technical or implementation details imposed by those terms.

The term always-on connection as used throughout this application means that a connection is only temporary used by a user or an application, and that there are at least one or more idle periods between those periods where the connection is used. The length of an always-on connection could be anything from several minutes, hours, days, months or even years.

Idle periods are periods without any user or application traffic (special kind of traffic might be still present, this is further detailed later on). The length of an idle period could be anything from several seconds, hours, days or even longer.

Within FIGS. 1 to 9, for ease of description, means or portions which may provide main functionalities are depicted with solid functional blocks or arrows and/or a normal font, while means or portions which may provide optional functions are depicted with dashed functional blocks or arrows and/or an italic font.

Figure 1:
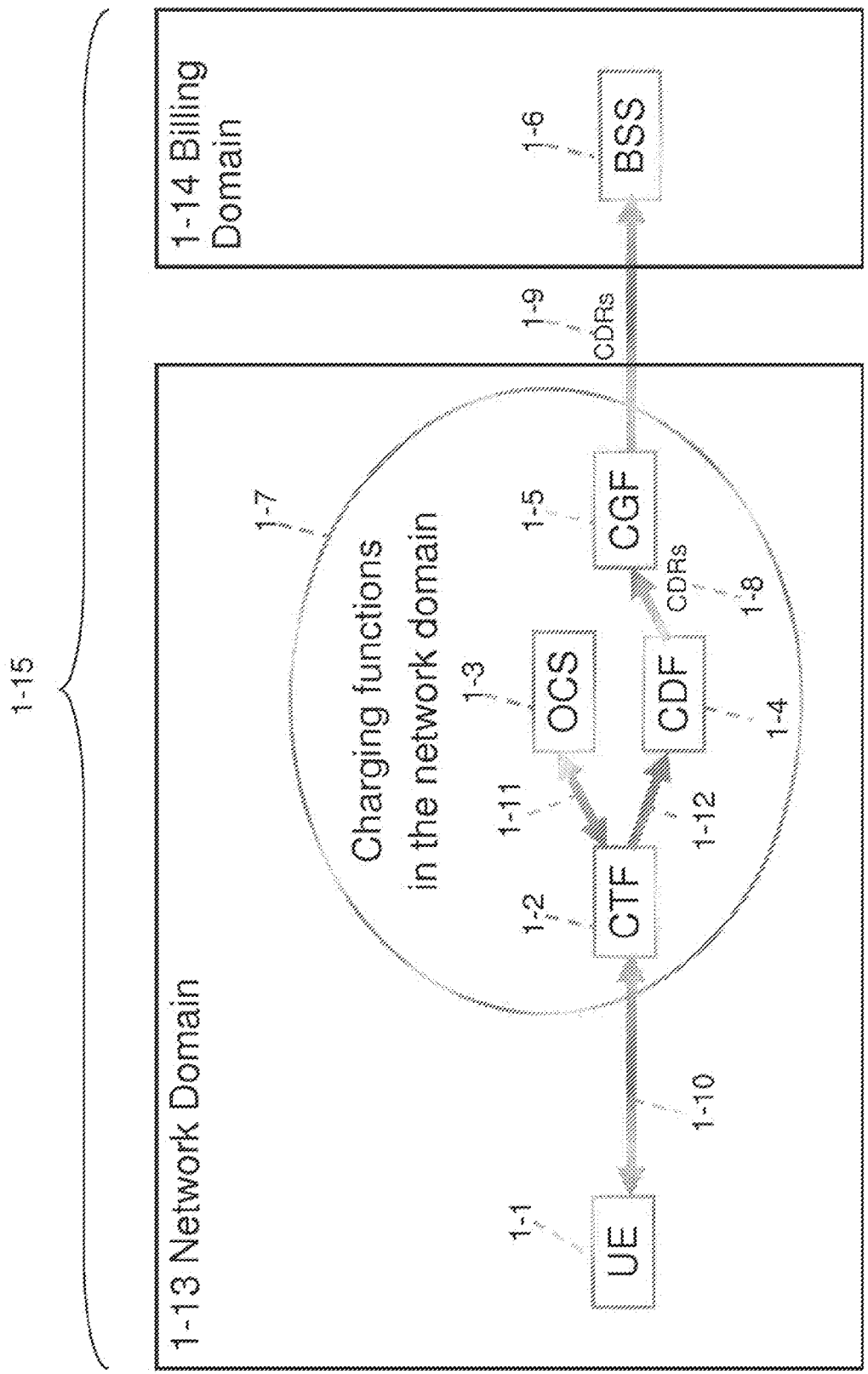
FIG. 1 illustrates a high level charging architecture.

FIG. 1 shows a high level charging architecture for data networks 1-15, for example a mobile radio network. Charging functions can be divided into functions located in the network domain 1-13 and in the billing domain 1-14. In the network domain charging related data is generated based on user connections/traffic and is forwarded to the billing domain for further processing. Most of the charging functions in the network domain 1-13 are typically implemented in network elements together with other transmission functions (for example transmission functions processing user plane traffic) . Packet Data Network Gateway The shown charging elements in FIG. 1 apply to online and offline charging schemes. However not all elements are used for both schemes. In the description below it can be assumed that the elements are used in both schemes (online and offline charging) if it is not explicitly stated otherwise.

In case of online charging the charging happens in real time. A connection or service request 1-10 (for example over a PDP context) from the end user 1-1 is forwarded to the Online Charging System 1-3 (OCS) which checks whether the request is accepted or not (for example based on the account status of the user). The OCS 1-3 signals the result of the check back. When the request is accepted the OCS might limit the usage time or amount of data to be transferred over the connection. If one of those limits are exceeded the OCS must be contacted again in order to request a further extension of the requested connection/service.

For off-line charging information is collected and accumulated over a certain time. The end user 1-1 will then be billed for example on a monthly basis for the charges he has generated. In case of off-line charging no acceptance check of the connection or the service requested by the end user is done like for on-line charging, therefore off-line charging does not involve the OCS 1-3.

The connection towards the end user 1-1 is monitored by the Charging Trigger Function 1-2 (CTF) which generates charging related triggers (also named charging events or charging indications, see 1-11 and 1-12. The charging triggers are generated for example based on the observation of signaling connections towards the user equipment 1-1 in order to determine the network resources and the services used by the end user. The generated triggers (which might be also in form of a connection or service request for on-line charging) are forwarded to the Charging Data Function 1-4 (CDF) or the OCS 1-3. The CTF 1-2 is further able to enforce the termination of a connection towards the user equipment 1-1 when permission by the OCS is not granted or expires.

The CDF 1-4 receives charging triggers (charging events, 1-12) from the CTF and generates Charging Data Records 1-8 (CDRs) based on the received information. CDRs may be constructed from single charging trigger events or from a set of several charging events. Charging trigger events of different types may be combined in one CDR. The CDRs are then transmitted to the Billing Domain 1-14 via the Charging Gateway Function 1-5 (CGF). The Billing domain includes the billing support system 1-6 (BSS) where the received charging data is processed for billing and/or statistical purposes.

CDRs are an integral part of the offline charging scheme and might be used also for online charging, for example to submit charging related information from the OCS 1-3 to the billing domain 1-14.

Figure 2A:
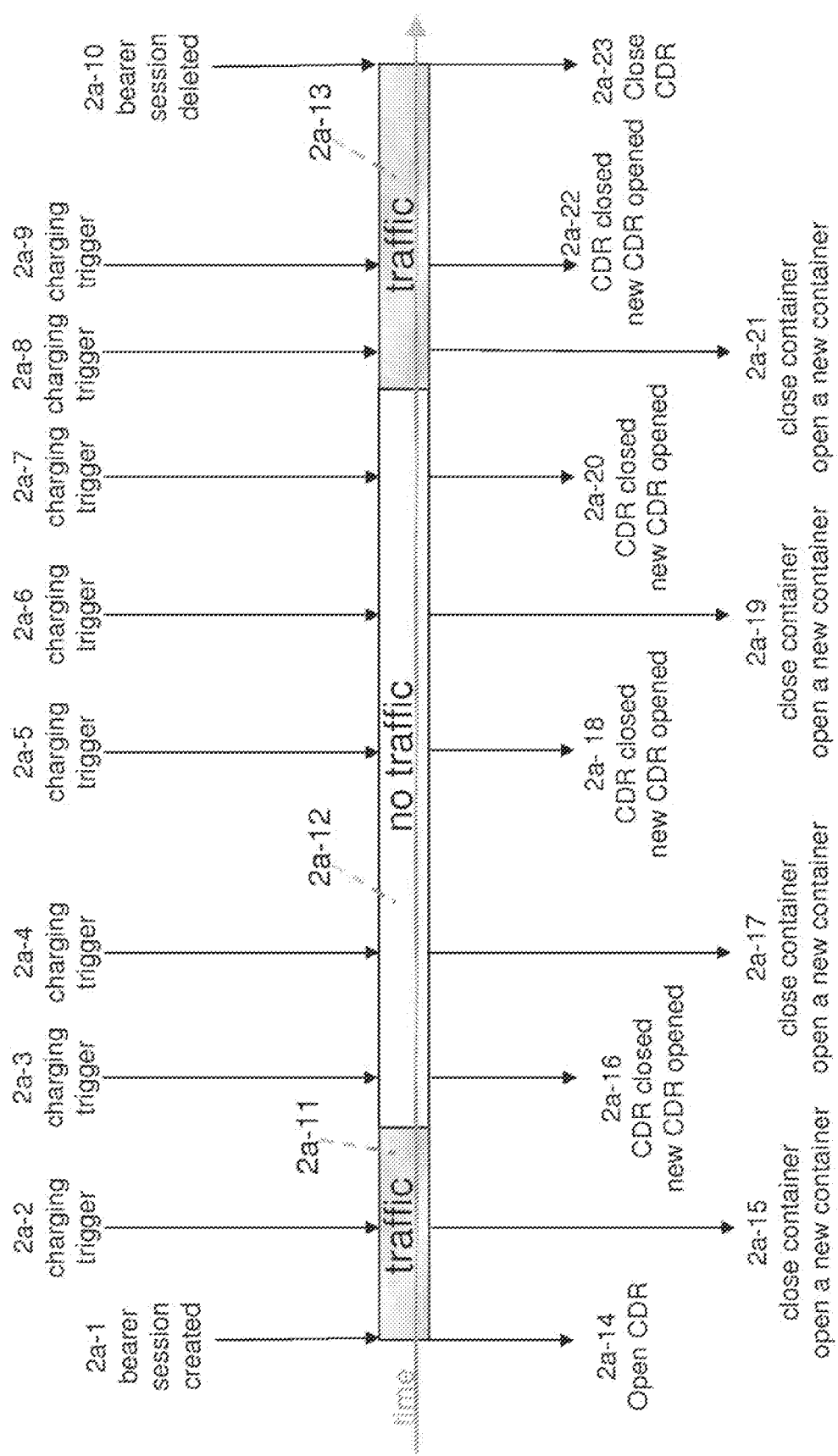
FIG. 2a presents the generation of charging data.

FIG. 2a shows processing of the charging triggers received from the CTF in the CDF and the generation of CDRs during a connection life time of an always-on connection with typical longer idle periods where no user traffic is present (2a-12, in FIG. 2a reduced to only one period for simplification reasons). The triggers in FIG. 2a define a time point where an event happens (for example a charging event).

When the connection is created the CDF is informed about the new connection 2a-1 and a first CDR is opened 2a-14. After the connection has been started, charging triggers 2a-2 to 2a-9 are received throughout the whole connection life time (for simplification reasons it is not distinguished between different types of charging triggers). Triggers are even received during periods where the connection is idle and no user data is present 2a-12. Based on the received charging triggers 2a-2 to 2a-9 data is written to the open CDRs in form of a so called container 2a-15 to 2a-22. When a CDR is closed, e.g. 2a-16, 2a-18, 2a-20, 2a-22', the open container is closed as well. With the opening of a new CDR also a new container is opened.

When a CDR includes a certain amount of containers, or has been open for a maximum amount of time (max CDR open time), it is closed and a new CDR is opened, see 2a-16, 2a-18, 2a-20, 2a-22. Even if no charging trigger has been received during the "max CDR open time" at least one container may be added to the CDR before closing it (the container might be empty). The expiration of the "max CDR open time" limit might be interpreted as a kind of charging trigger causing the opening of a container which is then immediately closed again because the CDR is closed. As a result each generated CDR may contain at least one container.

Each CDR contains time-stamps indicating when the CDR was opened and closed. As long as the connection is active the closing of a CDR always causes the opening of a new CDR, therefore the closing time-stamp of the previous CDR and the opening time-stamp of the new CDR are the same.

The closed CDR is then transmitted to the billing domain (see FIG. 1/1-14) via the CGF (FIG. 1/1-5). This procedure continues until the connection is terminated as indicated by indication 2a-10. As a result of the connection termination (deletion of the bearer session) the open CDR will be closed and no new CDR is opened for the connection 2a-23.

During longer periods where no user traffic occurs (so called idle periods, 2a-12), charging triggers 2a-3 to 2a-7 might be still received from the CTF leading to the generation of containers stored in the open CDRs 2a-17, 2a-19, and to the closing and opening of new CDRs 2a-16, 2a-18, 2a-20 as described above. Thus CDRs may be even generated and forwarded to the billing domain during longer idle periods that typically occur for during always-on connection. Those CDRs are loading the network and consuming network recourses even if they might not contain relevant charging information due to the idleness of the user connection. Further on those CDR may be stored by the network operator (for example the Internet Service Provider (ISP)) for a certain time as required by national law.

Figure 2B:
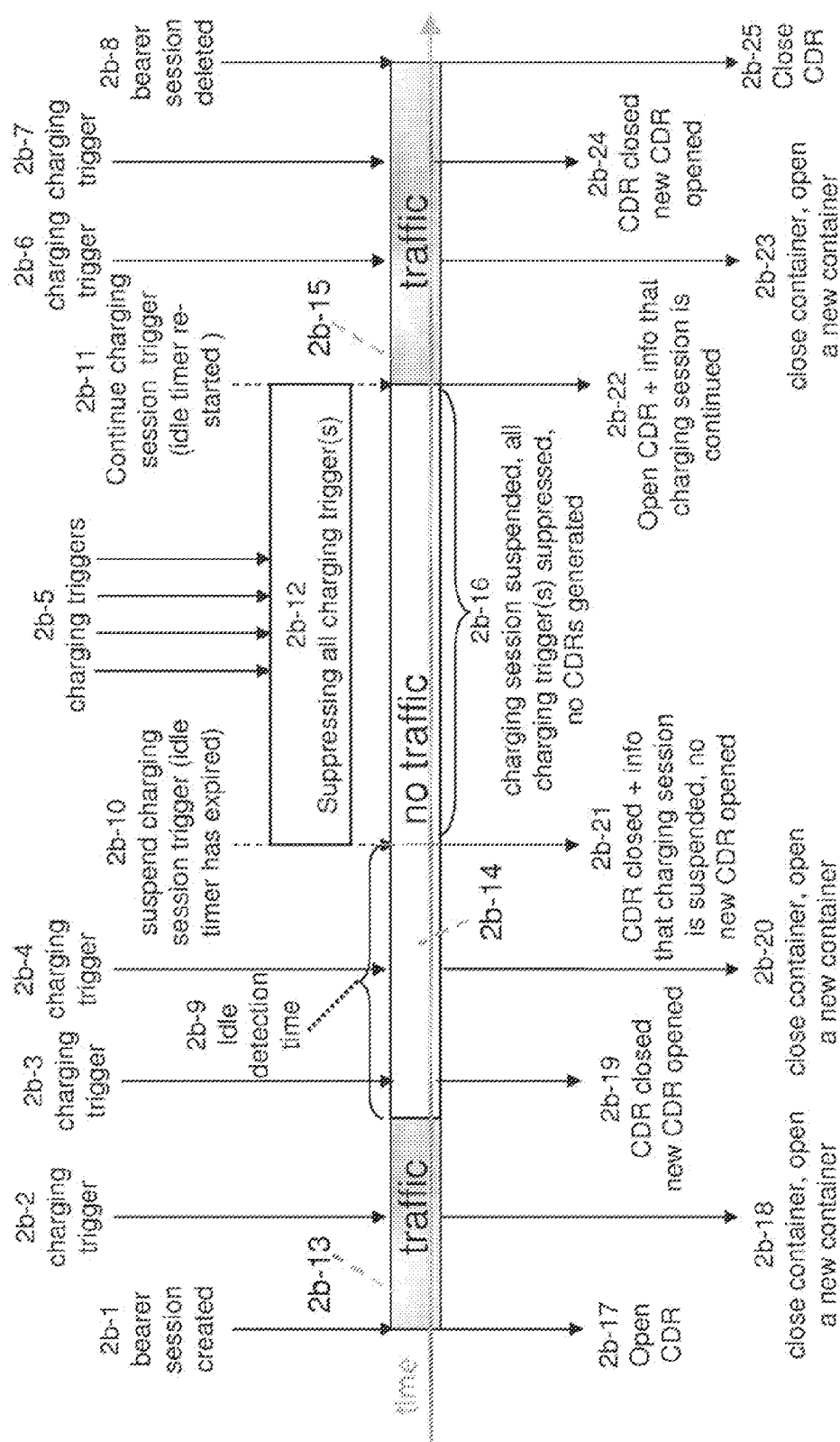
FIG. 2b presents an example of a charging session according to the invention in the network domain.

FIG. 2b shows an example how the present invention can reduce the generation of charging data records (CDRs) by suspending the charging session, which is one key element of the the present invention.

Like in FIG. 2a charging triggers 2b-2 to 2b-7 are received from the CTF and the charging session is started by opening the first CDR 2b-17 after receiving the bearer session created indication 2b-1. Further on (as in FIG. 2a) triggers define a time point where an event happens (for example a charging event).

If the connection becomes idle (no user traffic is present, 2b-14) the detection of the idle connection is started. Idle connection detection might take some time (2b-9, for example an idle connection is detected after an idle timer has expired and no data/traffic was present on the connection from start of the idle timer until it expires, see FIG. 4). After the "idle detection time" 2b-9 is over and an idle always-on connection is detected a "suspend charging session trigger" is generated (2b-10, for example by the CTF).

Figure 3:
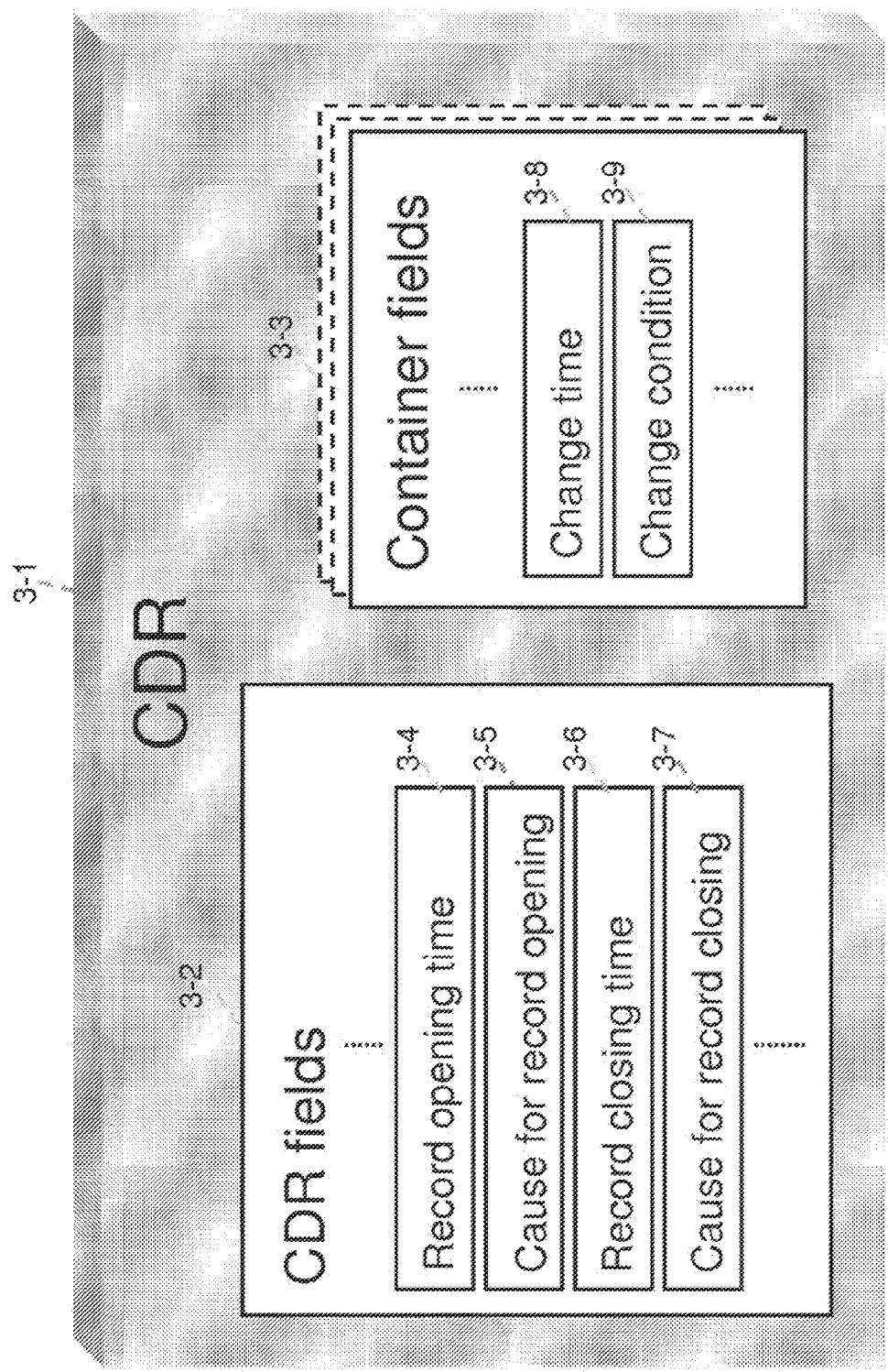
FIG. 3 shows example fields of a Charging Data Record (CDR) relevant for the invention.

The "suspend charging session trigger" may close the current open CDR 2b-21 without opening a new one, and indicates the cause for the closing of the CDR in a field of the CDR or in a field of the last container in the CDR (for example in the "cause for record closing" field 3-7 or the "change condition" field 3-9 shown in FIG. 3). Together with the indication that the charging session is suspended a time-stamp indicating when the suspending of the charging session started is coded in dedicated fields in the CDR or the container (for example in the "record closing time" field 3-6 or the "Change time" field 3-8 shown in FIG. 3). Instead (or in addition) to the time-stamp indicating when the suspending of the charging session is started the start of the actual idle period on the always-on connection 2b-14 might be coded to the CDR/container too, by taking the idle detection time 2b-9 into account. As another option the idle detection time (2b-9) might be coded as well so that the time point when the period with no traffic 2b-14 started can be later on calculated based on the information in the CDR (the time-stamp indicating when the suspending of the charging session is started and the used idle detection time).

Further on, after detecting that the connection is idle, charging triggers 2b-5 received during the idle period of the connection are suppressed 2b-12 in order to reduce the generation of CDRs based on those charging triggers. The suppressing of charging triggers might be done selectively for different charging triggers types or for all charging triggers as shown in the example FIG. 2b. If all charging triggers are suppressed CDR generation based on the triggers may stop completely 2b-16.

Examples of charging triggers are Quality of Service (QoS) change, Tariff time change, Cell Global Identifier (CGI) change, Service Area Identifier (SAI) change, Routing Area Identity (RAI) change and Packet data Protocol (PDP) context modification.

After the connection becomes active again (traffic is present again, 2b-15) this is detected (for example by noticing a first user data packet on the connection), the charging session is continued and the idle detection timer is restarted. A "Continue charging session" trigger is generated 2b-11 (for example by the CTF) and the suppression of the charging triggers is stopped. A new CDR is opened 2b-22 and a "charging session continued" indication may be coded to the CDR or the first opened container (for example into field "Cause for record opening" 3-5 or "change condition" field 3-9 shown in FIG. 3). Together with the indication that the charging session is continued a time-stamp indicating when the continuation of the charging session is started might be coded in dedicated fields in the CDR or the container (for example in the "record opening time" field 3-5 or the "Change time" field 3-8 shown in FIG. 3). The receiving of charging triggers 2b-6, 2b-7 and the generation of CDRs 2b-23, 2b-24 continues as before until either the next idle period is detected (not shown) or the connection is terminated 2b-8 and the last CDR is closed 2b-25.

Suspending a charging session does not mean that no CDRs are generated at all during the period when the charging session is suspended. CDRs might still be generated during the suspended charging session, for example for received charging triggers that are not suppressed (this might be needed for important charging triggers which shall not be suppressed even when the connection/data session is idle and the charging session is suspended). This is shown in more detail in FIG. 5. Only if all charging triggers are suppressed no CDRs may be generated when the charging session is suspended.

As visible from FIG. 2b CDR generation is reduced (or even stopped as shown) during the detected idle period of the user connection, which result in a reduced network load because less CDRs are transmitted to the billing domain. Further on the amount of CDRs to be stored (as required by national law) is reduced by the above described embodiment of the invention. The advantage of the invention increases proportional with the amount of always-on connections and the amount and length of the idle periods during the connection.

FIG. 3 shows a CDR 3-1 including example fields used by the present invention. A CDR may contain one or more containers.

Each CDR includes CDR specific fields 3-2 and fields which are specific for each container 3-3 included in the CDR. There may be more fields in a CDR/container as shown in FIG. 3. Those not shown fields are out of scope of this invention and are therefore not mentioned here.

The fields presented in FIG. 3 are just example fields. Field names may be different and one or more fields may be combined or left away. Further on information coded into CDR and container specific fields might be redundant and therefore some of the fields might not be used at all.

FIG. 3 illustrated four CDR specific fields, 3-4, 3-5, 3-6 and 3-7, and 2 container specific fields, 3-8 and 3-9, that may be used by the present invention:

"Record Opening Time" 3-4 (=CDR opening time)
"Cause for record opening" 3-5 (=reason for opening CDR)
"Record Closing Time" 3-6 (=CDR closing time)
"Cause for Record Closing" 3-7 (=reason for closing CDR).
"Change time" 3-8 (=container closing time, which equals the CDR closing time for the last container in the CDR)
"Change condition" 3-9 (=reason for the closing of the container, which may be used in the last container of the CDR to indicate the reason for closing the CDR).

Each CDR 3-1 may have at least one container, which is closed when the CDR is closed.

The reason for opening a new CDR might be coded for example to the "Cause for record opening" field 3-4 on CDR level, the time-stamp when the CDR is opened to the "Record opening time" field 3-5. Reasons for opening a new CDR could be for example a "Charging session continued" indication when a period ends where the charging session has been suspended. As another option (not shown) information related to opening a new CDR might be coded as well to fields in the first container of the CDR. For this purpose dedicated container fields carrying the "CDR opening time-stamp" and the "reasons for opening the CDR" might be needed for the first container in the CDR (this option is not shown in FIG. 3).

The reason for closing a CDR might be coded into the "Cause for record closing" field 3-7 on CDR level or to the "change condition" field 3-9 of the last container in the CDR closed together with the CDR. The time-stamp when the CDR is closed might be coded in the "Record closing time" field 3-6 on CDR level or into the "change time" field 3-8 of the last container closed together with the CDR.

As reason for closing a CDR 3-4 it might be indicated that the charging session is suspended (see for example FIG. 2b/2b-21 and the explanation to FIG. 2b above). This indication might be generated when the start of an idle period on the always-on connection is detected (see FIG. 2b/2b-10 and FIG. 5/5-35b).

Closing a CDR by the "Suspend Charging session trigger" is optional. The closing of the CDR is kept optional because under some circumstances it might make sense to keep the CDR open and close only the present container (for example if not all triggers are suppressed). However in a preferred embodiment of the invention the CDR is closed.

The closed CDR is then transmitted to the billing system which may notice from the information coded in the CDR and/or container fields that the charging session has been suspended and the time when the suspending of the charging session was started, or the time when the always-on connection became idle.

The time when the suspending of the charging session was started is the time when the idle detection detects the idle connection, while the time when the always-on connection became idle can be calculated by subtracting from the time-stamp when the suspending of the charging session is started the idle detection time (this allows a more accurate calculation of the always-on connection idle time, which may be used for example in the billing system to increase the billing accuracy so that the user is billed only for the time where he really has used the connection). The subtraction of the idle detection time might be done before coding the time-stamp information to the CDR/container field(s) or later on in the billing system (assuming that the billing system is aware of the used idle detection time).

The "Continue charging session trigger", which occurs when the idle period ends (see FIG. 2b/2b-11), opens a new CDR (see FIG. 2b/2b-22). Optionally the cause for the opening of the CDR (the charging session is continued) and the opening time (time-stamp when the continuation of the charging session is started) may be coded in CDR fields "cause for record opening" 3-5 and "Record Opening Time" 3-4. The billing system may then recognize from the received CDR content that the charging session is continued.

If all charging triggers are suppressed then the next received CDR by the billing system automatically means that the charging session is continued. In this case the "Charging session continued" indication in the "cause for record opening" field is not really needed and may be left away. However leaving the "Charging session continued" indication away poses the problem that the billing system can not distinguish between a period where CDRs were lost (e.g. due to transmission errors or interruption in one transmission link carrying the charging information) and a period where CDRs were not generated because the charging session was suspended. Therefore coding "charging session suspended" and "charging session continued" indications in the CDRs and/or container fields offers an additional advantage since the billing system (or the device receiving and terminating the CDRs at the remote end) is able to detect if CDRs are lost or simply no CDRs are generated and transmitted due to a suspended charging session.

Figure 4:
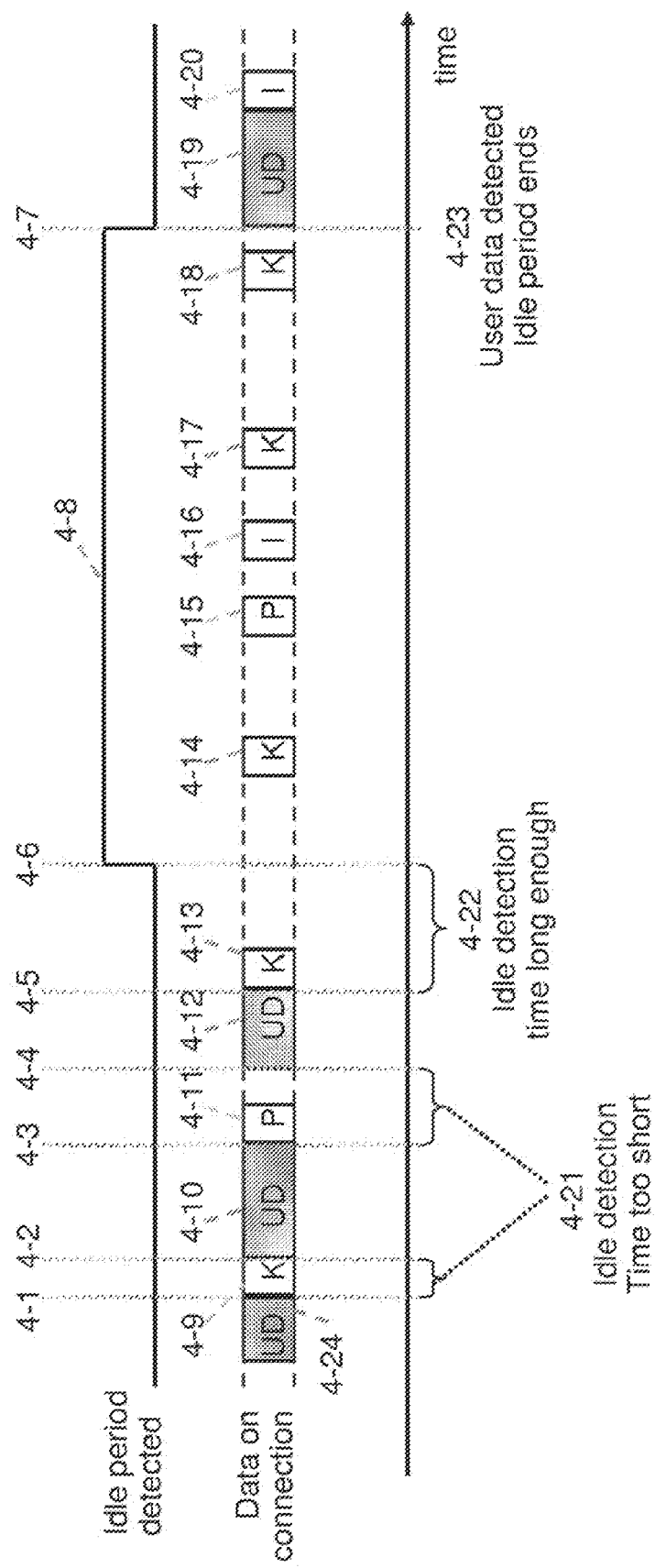
FIG. 4 presents an example how to detect an idle always-on connection according to the invention.

FIG. 4 illustrates an example how an idle period on an always-on connection can be detected according to the invention.

In FIG. 4 "UD" means "User data", "K" means "Keep alive" message, "P" means "Polling message" and "I" means "ICMP (Internet Control Message Protocol) message". Keep alive messages may be used by applications to check in periodic time intervals that the remote peer is still "alive". This is especially needed if no data is transmitted between the peers for a longer period. A further example where keep alive messages may be used is between routers in the Internet. Polling messages are for example used to requesting status information from a remote device, typically in a master slave environment where the master tells the slaves when they are allowed to send the requested status information. Polling events may appear in a certain periodic frequency on connection with network management traffic (for example network management system polling managed network devices from time to time to determine their current status). ICMP messages are belonging to the Internet protocol Messages Protocol (ICMP) which delivers error and control messages between a destination host and the source host about IP datagram processing.

Keep alive messages 4-9, 4,13, 4-14, 4-17, 4-18, polling messages 4-11, 4-15 and ICMP messages 4-16, 4-20 may be non user generated messages and may occur frequently on the always-on connection between the user equipment (UE) and a peer device in the network. Those messages may be used for example for network control, service and management tasks as outlined above. Often the end user shall not be charged for such kind of traffic, therefore those messages may be ignored during the idle detection process of an always-on connection, determining "idle" periods where the end user shall be not charged for as shown in FIG. 4 4-8.

The idle detection process starts when a period with user data (UD) 4-24, 4-10, 4-12, 4-19 ends 4-1, 4-3, 4-5. An idle detection timer is started at the end of an UD period. If the timer reaches a defined maximum value (for example 4-6/4-22) the always-on connection is declared as being idle 4-8 The timer is stopped and reset when UD is detected again 4-2, 4-4, 4-7. If UD is detected before the timer has reached its maximum value no idle period is detected (the interval between the 2 UD segments is too short, see 4-21). If UD is detected during an idle period 4-7 the end of the idle period is declared 4-23, the idle timer is reset and the idle period detection process may start again.

The starting of an idle period may be detected with some delay due to the idle detection time that might be required to detect the idle period 4-22. Therefore when time-stamping the starting time when the period with no user data starts on the always-on connection 4-5 the needed idle detection time 4-22 shall be taken into account: For example the time-stamp when the connection became idle 4-5=idle detection time-stamp 4-6−detection time 4-22.

As outlined above keep alive, polling and ICMP messages may be ignored by the idle detection process as shown in FIG. 4. Those messages do not force the idle timer to be reset. A detected idle period 4-8 for an always-on connection continues even if those messages are transmitted during the idle period (see 4-14, 4-15, 4-16, 4-17, 4-18).

It should be noted, that the keep alive, polling and ICMP messages are only examples of non user generated traffic which might be ignored by the idle detection process. What kind of messages or traffic shall be ignored depends at the end on the network operator requirements about what kind of traffic the user shall be not charged for.

Figure 5:
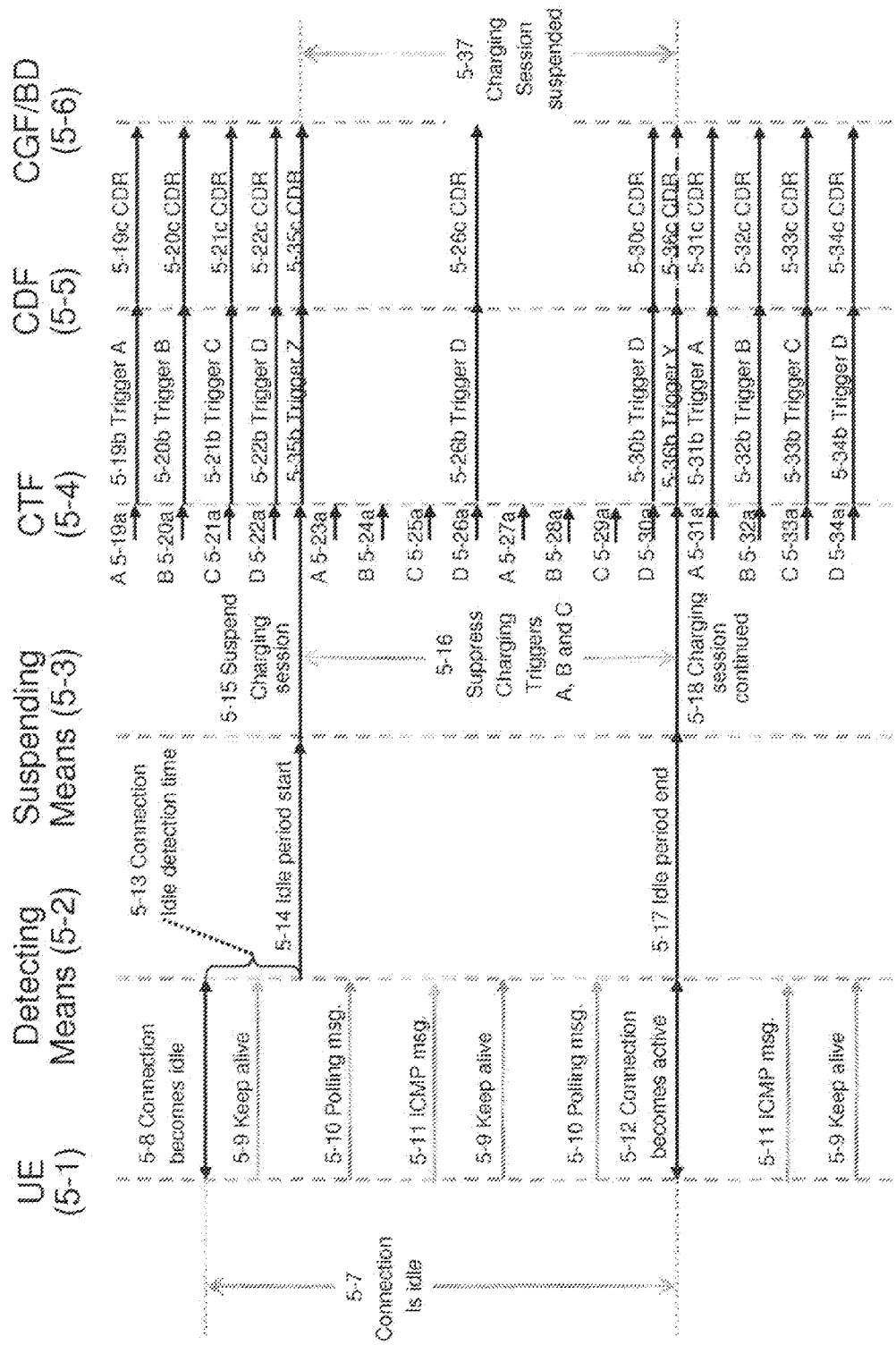
FIG. 5 illustrates an example signaling diagram of a charging session according to the invention in the network domain.

FIG. 5 shows an example message signaling diagram of the invention. It is assumed that the user equipment has already established an always-on connection and user plane data is transferred. Charging Trigger Function (CTF, 5-4) detects events A 5-19a, B 5-20a C 5-21a, D 5-22a, generates charging triggers for those events 5-19b, 5-20b, 5-21b and 5-22b and forwards the triggers to the CDF 5-5 for Charging Data Record (CDR) generation. The CDF then generates CDRs 5-19c, 5-20c, 5-21c, 5-22c and forwards them to the Billing Domain (BD), for example via a Charging Gateway Function 5-6.

In the example shown in FIG. 5 it is assumed that for each trigger a dedicated CDR is generated (so each CDR contains maximum one container). In reality it is also possible that a CDR may contain multiple containers (not shown), then dedicated CDRs will be not generated for every trigger received by the CDF. For illustrating the present invention it does not matter if a CDR contains one or more containers, therefore the example shown in FIG. 5 is simplified by assuming that a CDR contains maximum one container. However, the invention is not limited to the shown example and might be used also when CDRs containing more than one container.

As shown at 5-8 the always-on connection becomes idle (no user data from/to the UE 5-1 is transmitted over the connection anymore). However during the idle period keep alive messages 5-9, polling messages (5-10) and ICMP messages 5-11 may be still transmitted over the always-on connection. As further detailed in FIG. 4 and the related description those messages might be ignored during the idle time detection.

The detecting means 5-2 monitors the connection and detects when the always-on connection becomes idle. As outlined in FIG. 4 and the related description idle detection might take some time 5-13. After the detecting means 5-2 has detected the start of an idle period it sends an "idle period start" indication 5-14 to a suspending means 5-3 which then initiates the suspending of the related charging session.

The suspending means 5-3 sends a "suspend charging session" indication 5-15 to the CTF 5-4 which then generates a "charging session suspended" indication/trigger (Trigger Z, 5-35b) which might initiate the closing of an open CDR in the CDF 5-5. Before the CDR is closed indications that the "charging session is suspended" and a time-stamp when the suspending of the charging session is started and/or a time-stamp when the connection became idle is coded to CDR and/or container related fields as described earlier in relationship to FIG. 3. The resulting CDR 5-35c may be transmitted to the BD 5-6 to indicate that the charging session has been suspended 5-37. Further on after receiving the "suspend charging session" indication 5-15 the CTF 5-4 initiates suppression of selected charging triggers (in the shown example triggers A, B and C are suppressed, while trigger D isn't suppressed). The suppressing itself may happen physically for example in the CTF, the CDF or any device that might be located in-between. In the example FIG. 5 the suppression in the CTF is shown. Events A 5-23a and 5-27a, B 5-24a and 5-28a and C 5-25a, 5-29a are not generating any charging triggers towards the CDF 5-5 during the "suppression charging triggers" period 5-16. Event D 5-26a, 5-30a is not suppressed during the "suppression period" 5-16 and still results in the generation of charging triggers 5-26b, 5-30b generated by the CTF 5-4 and forwarded to the CDF 5-5. The CDF then generates CDRs 5-26c, 5-30c related to those not suppressed triggers during the "Suppress charging triggers" period 5-16. A CDR generated for a not suppressed trigger (for example 5-26c, 5-30c) might be opened right after the trigger is received from the CTF and might be directly closed again after the charging information related to the received trigger was added to the CDR. Alternatively the CDR could remain open until either the maximum container number for the CDR is reached or the maximum CDR open time is exceeded.

Even if CDRs 5-26c, 5-30c are generated for the not suppressed trigger D the charging session it self is still regarded as suspended (period 5-37) until the end of the idle period for the connection 5-7 is detected.

At 5-12 the user equipment 5-1 starts to generate traffic on the always-on connection and thus the idle state of the connection 5-7 ends. The end of the idle connection is detected by the detecting means 5-2 and an "idle period end" indication 5-17 is send to the suspending means 5-3. Detecting that the always-on connection becomes active again by the detecting means 5-2 may happen quite fast, since it is already enough to just detect one user packet/message (an idle timer, like it may be used for detecting the start of the idle period, is not needed here).

When the suspending means 5-3 receives the idle period end indication 5-17 from the detecting means 5-2, it initiates the opening of a new CDR 5-36c by sending a "charging session continued" event 5-18 to the CTF which then generates trigger Y 5-36b towards the CDF where the new CDR 5-36c is finally opened. This new CDR may contain "Charging session continued" indication as "cause for record opening" and a time-stamp indicating when the continuation of the charging session is started as opening time-stamp information coded into CDR/container field(s) as illustrated in FIG. 3. This CDR 5-36c may be send directly to the billing domain 5-6 which may extract the information coded to the CDR/container fields and may detect that the charging session is continuing (the charging session suspended period 5-37 ends).

The trigger Y 5-36b does not necessarily result directly in a CDR 5-36c generated and transmitted to the billing domain as shown in FIG. 5. It is also possible that CDR 5-36c may only be opened by the CDF when receiving trigger 5-36b, and may not be closed and transmitted to the billing domain right away. In this case the CDR may be left open until for example the maximum CDR open time is exceeded or the next trigger is detected by the CDF (for example 5-31b), which then may lead to the closing of the CDR and the sending of the CDR towards the billing domain (in FIG. 5 this would mean that the sending of CDR 5-36c to the billing domain is omitted and CDR 5-31c includes then the "charging session continued" indication and the related time-stamp indicating when the continuation of the charging session is started).

Further on when the CTF 5-4 receives the "charging session continued" indication 5-18 from the suspending means 5-3 it stops the suppression of the triggers A, B and C, the "suppress charging triggers" period 5-16 ends. Events A, B, C and D received after the charging session is continued 5-31a, 5-32a, 5-33a, 5-34a result again in charging triggers 5-31b, 5-32b, 533b, 5-34b generated and forwarded by the CTF 5-4 to the CDF 5-5. The CDF then generates CDRs 5-31c, 5-32c, 5-33c and 5-34c as result of those triggers.

In FIG. 5 the suspending means passes more or less the "idle period start" and "idle period end" indications through towards the CTF (in the example FIG. 5 just the names of the indications are changed to "Suspend charging session" and "Charging session continues"). In reality such a strict separation in 5-2, 5-3, 5-4, 5-5 and 5-6 might not be done and the suspending means 5-3 might be combined with other functions (see also FIG. 6 and the related description below).

FIG. 5 just shows one example message signaling diagram of the invention. The invention shall be not limited to this embodiment.

Figure 6:
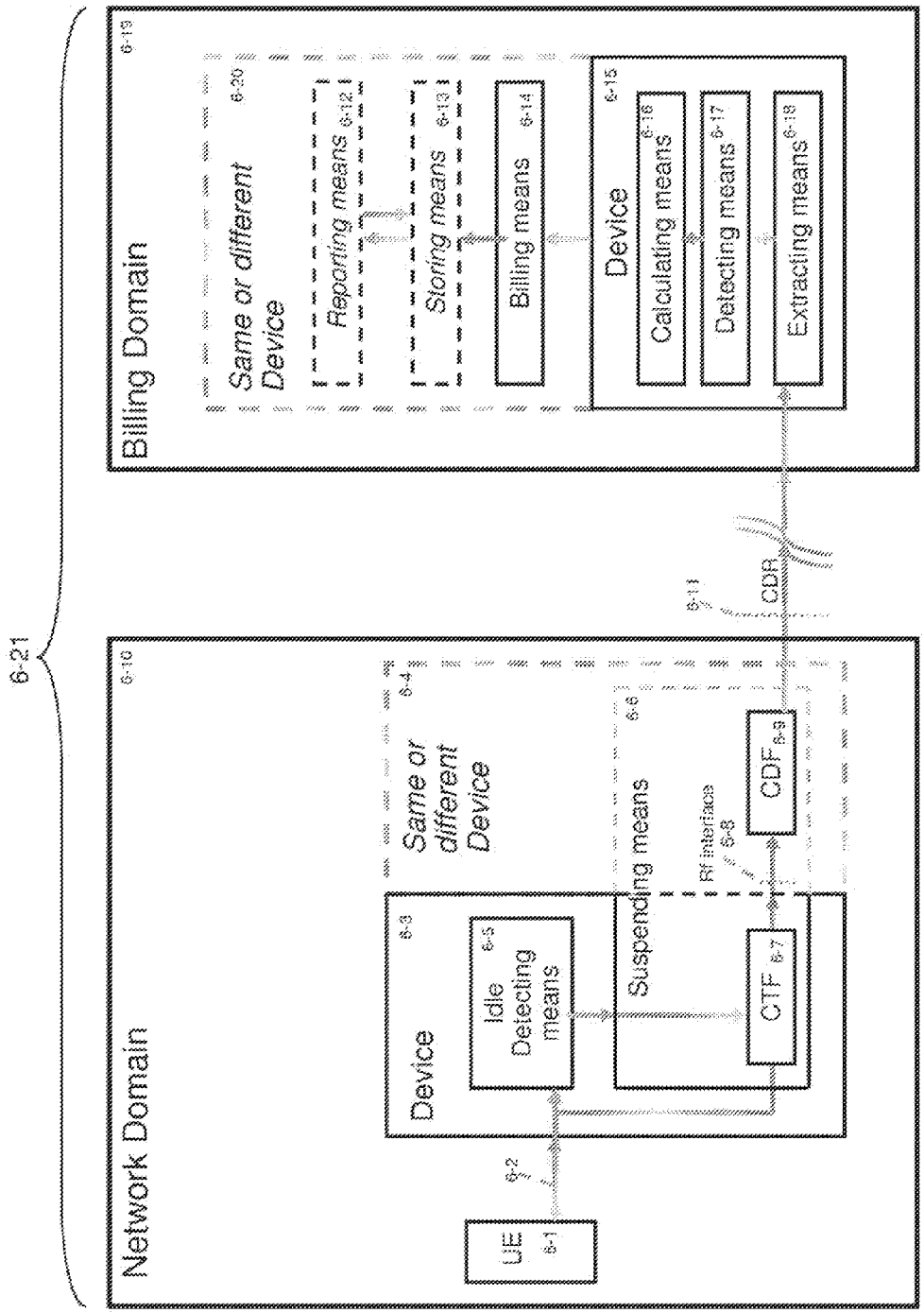
FIG. 6 illustrates internal structures and functions of devices implementing aspects of the invention.

FIG. 6 illustrates examples of internal structures and functions of devices implementing various aspects of the invention. The devices can be separated in one or more device(s) located in the network domain 6-10 and one or more device(s) located in the billing domain 6-19.

Only functions and parts related to the present invention are shown. Other functions, like for example those functions and means for adding/extracting CDR/container fields and information not relevant to the present invention are not shown.

The network domain includes the user equipment 6-1 (UE) terminating the always-on connection and one or more device(s) (for example 6-3, 6-4) implementing the network domain related charging functions of the invention, like for example the initiating of the suspending of a charging session, the generation and suppressing of charging triggers and the generation of CDRs. Those devices may not be dedicated to charging functions only, instead those devices may combine one or more of the described charging related functions together with other transmission function. Examples of those devices in the network domain are:

Gateway General Packet Radio Service Support Node (GGSN)
Serving General Packet Radio Service Support Node (SGSN)
Media Gateway (MGW)
Packet Data Gateway (PDG)
Packet Data Switching Node (PDSN)
Packet Data Network Gateway (PGW)
Serving Gateway (SGW)
Broadband Remote Access Server (BRAS)
Broadband Network Gateway (BNG)
Access Service Network Gateway (ASNGW)

The listed devices (network elements) above are just examples. The invention is not limited to those devices and can be implemented in any kind of device involved in charging of user plane data in the network domain 6-10.

FIG. 6 shows a system consisting of at least one device 6-3 in the network domain and at least one device 6-15 in the billing domain, where those devices may implement at least parts of the invention.

The example device 6-3 in the network domain includes an idle detection means 6-5 implementing functions related to the detection of idle periods on an always-on connection as for example shown in FIG. 4 and described earlier. The idle detection means 6-5 monitors the always-on connection 6-2 towards the UE 6-1 and generates the idle period start/end indications towards the suspending means 6-6 as detailed for example in FIG. 5.

Further on the device 6-3 includes the suspending means 6-6 which might include a Charging Trigger Function 6-7 (CTF) and Charging Data Function 6-9 (CDF) as well. The inclusion of CTF and CDF in the suspending means may be done since the suspending means initiates the suppression of charging related triggers generated in the CTF which in turn has a direct influence on the CDR generation. Further on the CTF may generate new triggers indicating the start and end of a period where the charging session is suspended towards the CDF, which in turn might code this information into CDRs that are transferred to the billing domain. By including CTF and CDF functionality in one device (for example 6-3/6-4 form one physical device) the Rf interface 6-8 becomes a device internal interface. Since the triggers from the CTF to the CDF are transferred over the Rf interface keeping this interface device internally allows to make proprietary modification to the Rf interface (by for example generating new triggers indicating the "charging session suspended" and "charging session continued" events in the CTF and transmitting them to the CDF) without the need to adapt other devices in the network and/or billing domain.

The suspending means 6-6 receives from the idle detection means indications when the start or the end of an idle period on the related always-on connection has been detected. Based on this information the CTF 6-7, which may be located in the suspending means as outlined above, might generate new triggers and information which is send to the CDF for generating related CDR and mapping the information into those CDRs (refer to FIG. 2b and FIG. 5 and the related descriptions above).

The CDRs generated be the CDF may include information when a charging session has been suspended (an indication that it has been suspended and the information about the time-stamp when the suspending of the charging session is started and/or when the idle period on the connection started) or information when the charging session is continued (an indication that the idle period has ended and so the charging session is continued+information about the time-stamp when the idle period has ended/the continuation of the charging session is started, which might be the time-stamp when the first user packet on the connection during an idle period has been detected).

Within the network domain the Idle detection means 6-5, the Suspending means 6-6, the CTF 6-7 and the CDF 6-9 may be included in one device, or in two or more separate devices in various combinations.

The CDRs generated in the network domain 6-10 are transferred via the interface 6-11 to the billing domain 6-19. In the billing domain 6-19 the billing for the user connection is performed. Users may be only billed for periods where they have really used the connections. Periods where an always-on connection was idle may be excluded from the bill.

Therefore the Billing Domain includes a device 6-15 which for example includes an "extracting means" 6-18, a "detection means" 6-17 and a "calculating means" 6-16. Those means are preferably located in one device, but could be also located in separate devices in any kind of combination.

Information from the received CDRs (coded into for example CDR/container fields as illustrated in FIG. 3) are extracted by the extracting means 6-18 in the billing domain. The extracted information may be partly forwarded directly to the billing means 6-14 (including the billing functions), the storing means 6-13 and at least partly to a detecting means 6-17.

The detecting means 6-17 detects from the extracted information received from the extracting means 6-18 charging session related information ("charging session suspended" and "charging session continued" indications, related time-stamp information+possibly the starting time-stamp when the always-on connection became idle).

The information related to "charging session suspended"/ "always-on connection idle" periods is then passed to the "calculating means" 6-16, which calculates the duration of the period where the charging session and/or the always-on connection has been suspended/idle. This might be done by calculating for example the time difference between the received time-stamps when the suspending of the charging session is started and the continuation of the charging session is started. The time-stamp related to start of the suspending of the charging session might already include the idle detection time, so that it indicates the starting time-stamp when the always-on connection became idle. If not, the idle detection time might be taken into account by the calculating means 6-16, for example by adding the idle detection time to the calculated charging session suspended time.

The information gathered and/or calculated about the idle periods of the always-on connection and/or the charging session suspended period are forwarded from the calculating means 6-16 to a billing means 6-14, which generates billing information for the user. The billing means might exclude indicated charging session suspended or idle periods of the always-on connection from charging.

The generated billing information is forwarded from the billing means 6-14 to a storing means 6-13 which stores billing related and possibly also other connection data that could be then later on retrieved from the storing means 6-13. A reporting means 6-12 generates the bills for the user or might report the stored data in some other way (for example by displaying the data on a screen or printing it).

The device 6-15 might be a Billing Support System (BSS) which might include a charging means 6-17, an idle time calculation means 6-16, a billing means 6-14, a storing means 6-13 and a reporting means 6-12 or any combination of those means.

Figure 7:
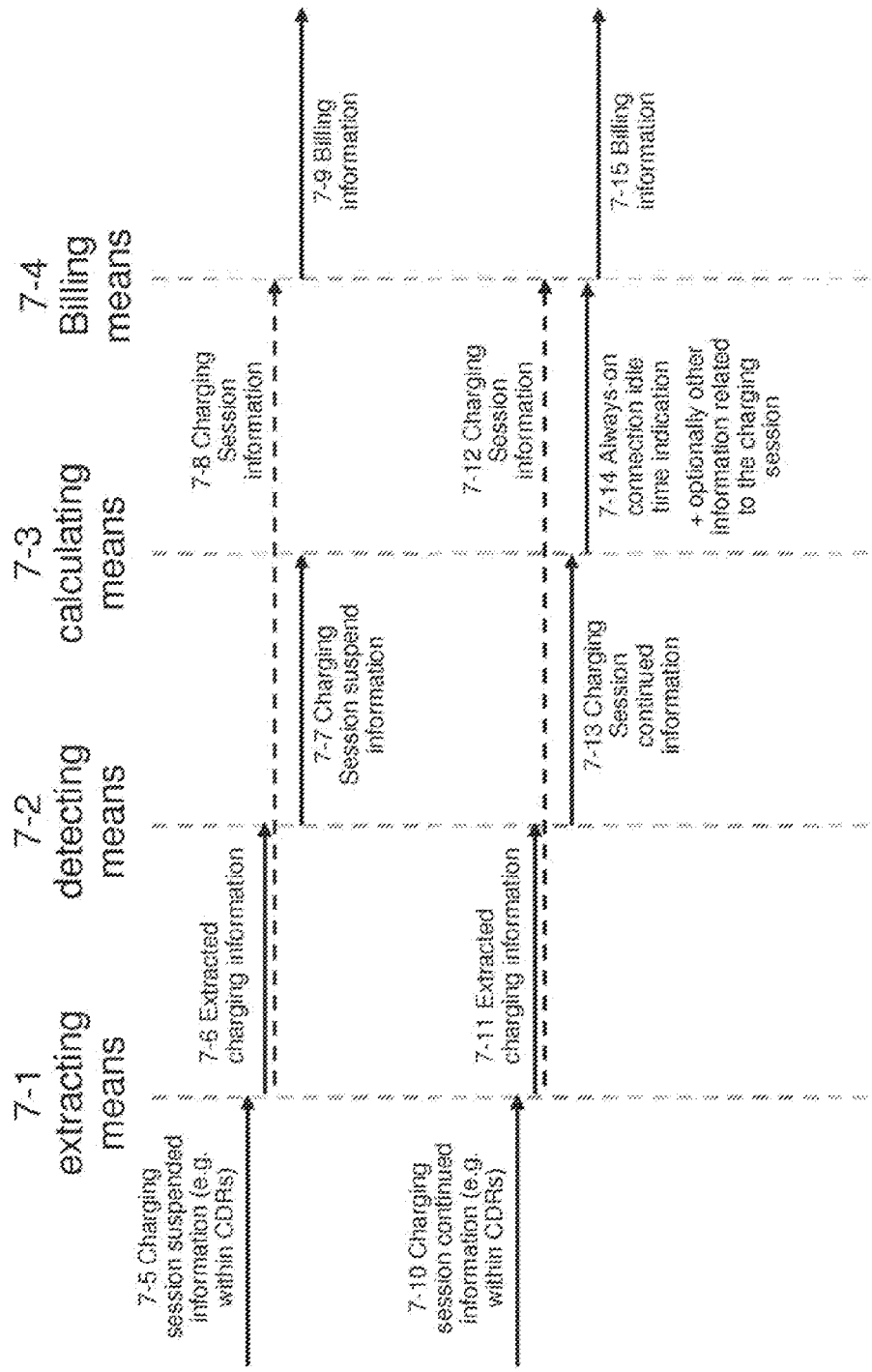
FIG. 7 presents an example signaling diagram of a charging session according to the invention in the billing domain.

FIG. 7 shows an example flow diagram illustrating the flow of charging information related to this invention in the billing domain.

The CDRs received from the network domain 7-5 include information about the status of a charging session like for example "charging session suspended" (start of charging session suspended period) and "charging session continued" (end of charging session suspended period) indications and the belonging time-stamp information coded into CDR and container fields as described in FIG. 3.

The extracting means 7-1 extracts charging information from the received CDRs 7-5 and forward the extracted charging information 7-6 to the detecting means 7-2 and optionally to the billing means 7-4 and/or storing means (not shown).

The detecting means 7-2 detects status changes of the charging session, for example if the charging session status changes from active to suspended and vice versa.

If a change from charging session active to charging session suspended is detected by the detection means 7-2 an indication indicating that the charging session has been suspended 7-7 is generated and forwarded to the calculating means 7-3 together with other related charging data (for example time-stamp information when the suspending of the charging session is started and/or when the related always-on connection became idle).

The time-stamp when the always-on connection became idle might be either extracted from the received CDR 7-5 in the extracting means and then forwarded to the calculating means 7-3 via the detecting means 7-2, or it might be calculated based on the time-stamp indicating the start of the suspended charging session and the idle detection time (for example always-on connection idle time-stamp=charging session suspended started time-stamp−idle detection time). This calculation may be done for example in the extracting means 7-1, the detecting means or 7-2 or the calculation means 7-3.

If a change from charging session suspended to charging session active is detected (the charging session is continued, 7-10) by the detecting means 7-2 an indication indicating that the charging session has been continued 7-13 is generated towards the calculating means 7-3. Together with this information other information related to the charging session, like for example the time-stamp when continuation of the charging session is started may be send from the detecting means 7-2 to the calculating means 7-3.

The calculating means stores the received charging session suspended related information 7-7. After it receives the charging session continued related information 7-13 belonging to the same charging session it may calculate the duration for how long the related always-on connection has been idle. This can be done for example by subtracting from time-stamp when the continuation of the charging session is started the time-stamp when the always-on connection became idle. The time-stamp when the always-on connection became idle might be either received directly from detecting means 7-2 or might be calculated by taking the time-stamp when the suspending of the charging session is started (might be also received from 7-2) and the idle detection time into account (e.g. by subtracting the idle detection time from the time-stamp when the suspending of the charging session is started).

The so calculated idle period of the always-on connection may be send 7-14 to the billing means 7-4, optionally together with additional information related to the charging session (for example information about the starting and the ending time-stamp of the idle period). Optionally the calculating means might also provide similar kind of information when the connection hasn't been idle (the connection was active) towards the billing means 7-4.

The billing means 7-4 takes all the received information 7-8, 7-12, 7-14 into account when generating billing information for charging the user of the always-on connection. Preferable indicated idle periods of the always-on connection (or periods when the charging session has been suspended) shall be not charged. The generated billing information 7-9 and 7-15 is then forwarded to a storing means (not shown in FIG. 7) and might be accessed from there by a reporting means (not shown) for generating the user specific bills or reporting of charging related information (for example to the network operator via a display device, as printed reports or in any other possible way).

The different means shown in the example flow diagram in FIG. 7 (means 7-1, 7-2, 7-3 and 7-4) might be located in separate devices, separate blocks in one device or combined in one or more devices in the billing domain. Preferable those means are all part of a billing support system (BSS).

Figure 8:
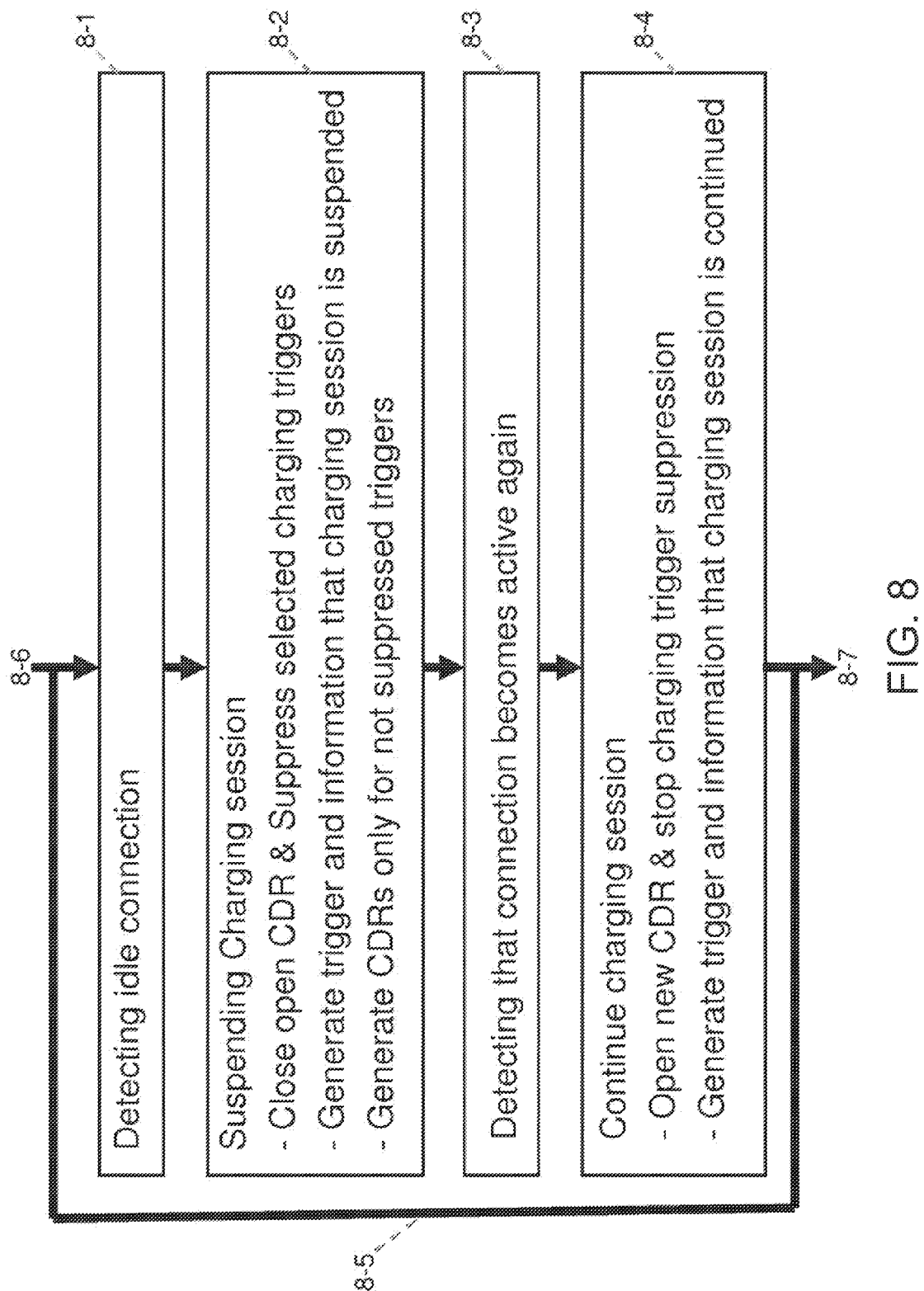
FIG. 8 shows an example process for a charging session according to the invention in the network domain.

FIG. 8 illustrates an example process of the invention in the network domain. After an always-on connection, where user traffic is transferred on, was set-up 8-6, the connection is monitored and it is detected when the connection becomes idle 8-1. The detection may happen with a delay (the so called idle detection time). Certain information and messages may be ignored during the idle detection (for example polling, keep alive and ICMP messages, refer to FIG. 4 and the related description).

After the start of an idle period on the always-on connection has been detected the belonging charging session is suspended 8-2. Suspending the charging session may result in the following actions:

1. Selected charging triggers are suppressed (in a preferred embodiment all triggers are suppressed). The selection which charging triggers are suppressed shall be configurable.
2. A trigger is generated indicating that the charging session is suspended.
3. Information that the charging session has been suspended and information about the time-stamp when the suspending of the charging session is started and/or when the always-on connection became idle is written to the open CDR and/or the last container in the CDR.
4. The CDR is closed, no new CDR is opened.
5. During the suspended charging session period a new CDR may be only opened and generated when not suppressed charging trigger(s) is/are detected. The charging session itself remains "suspended", independent if some CDRs are generated for those not suppressed triggers in-between.

The idle state of the always-on connection is observed by for example monitoring the always-on connection for user data. When user data is detected on the always-on connection an indication is generated that the connection became active again and that the charging session shall be continued 8-3. Special data (for example keep alive, polling or ICMP messages) may be ignored during the monitoring of the always on connection.

After the end of an idle period on the always-on connection has been detected by 8-3, the belonging charging session is continued 8-4. Continuing the charging session may result in the following actions:

1. The suppression of the charging triggers is stopped
2. A new CDR is opened.
3. A trigger is generated indicating that the charging session is continued.
4. Information that the charging session is continued and information about the time-stamp when the continuation of the charging session is started is written to the open CDR and/or a container in the CDR.
5. Optionally the CDR may be closed immediately and sent right away to the billing domain to indicate that the charging session is continuing.

The process continues by looping back 8-5 to continue monitoring the always-on connection and detect further possible idle periods. The looping back 8-5 continues until the always-on connection is terminated 8-7.

Figure 9:
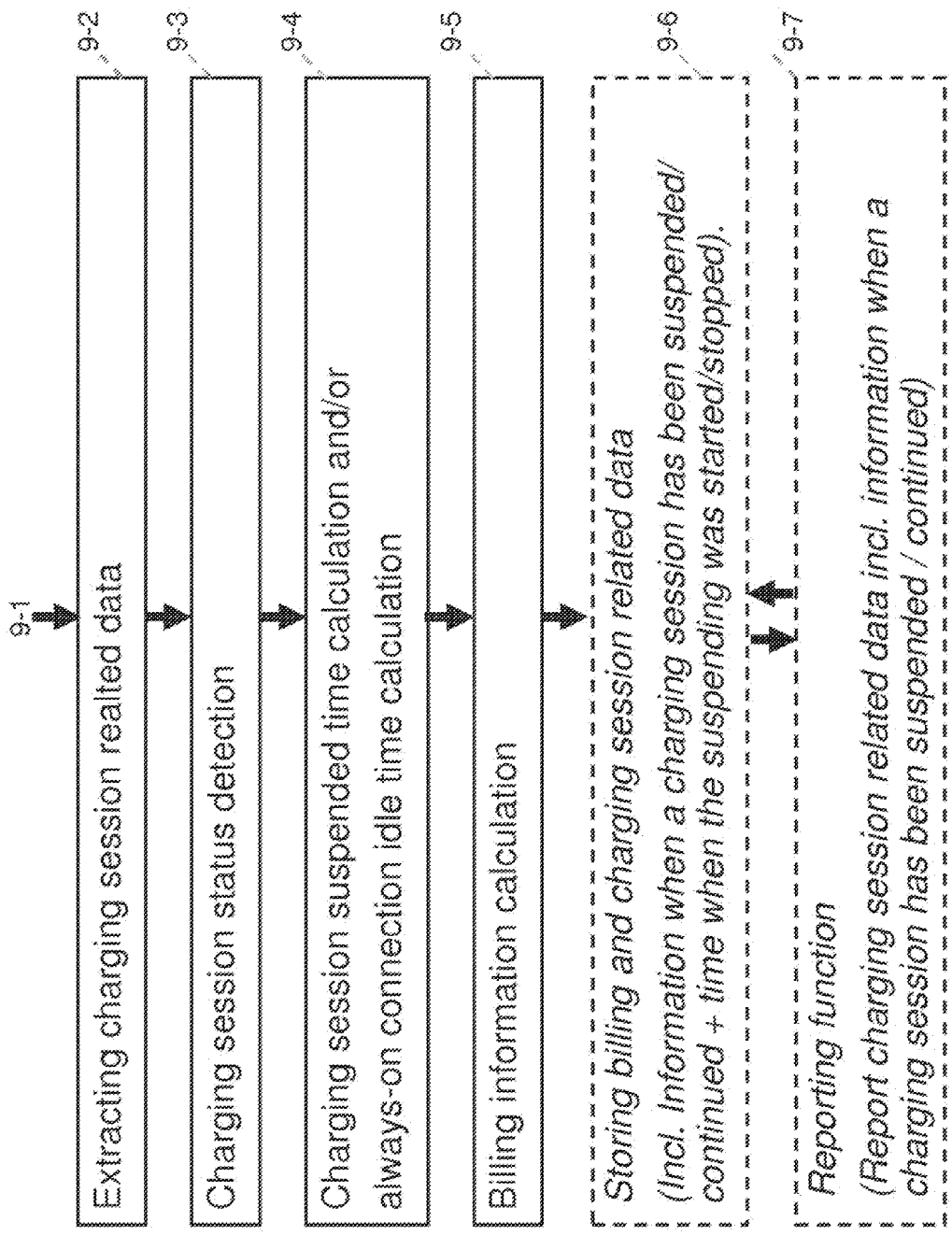
FIG. 9 shows an example process for a charging session according to the invention in the billing domain.

FIG. 9 illustrates an example process of the invention in the billing domain. After receiving the CDRs transmitted from the network domain 9-1 the CDRs may be terminated and the included information is extracted 9-2.

This extracted information may include beside other information also information about the status of a charging session (for example information if a charging session is suspended or if it is continued) and information about time-stamps when the status of a charging session and/or the always-on connection (e.g. idle or not) changed. The status of the charging session is monitored by 9-3. If a charging session status change is detected this is indicated to 9-4.

Based on the information when a charging session has been suspended and/or when the always-on connection became idle, and when the charging session is continued/the always-on connection becomes active again, the time periods when the charging session and/or the always-on connection was idle are calculated 9-4. If necessary the time-stamp when the always-on connection became idle may be calculated by taking the time-stamp when the suspending of the charging session is started and the needed idle detection time into account. Optionally also the time periods where the charging connection is not suspended and/or where the always-on connection is not idle may be calculated. The calculation results are forwarded for further procession to 9-5.

Based on the reported idle/active periods of an always-on connection and/or the periods where the charging session was suspended or active, and maybe other information extracted by 9-2, billing information for the user of the always-on connection is calculated 9-5. Preferable idle periods of the always-on connection shall be not billed since the user didn't generate any traffic during those periods. Alternatively the periods where the charging session has been suspended can be also used as periods where the user shall be not billed for. Periods where the charging session is suspended are comparable with the idle periods of the always-on connection, however the idle detection time is excluded. Therefore using the period where the charging session is suspended is less accurate. But if the idle detection time is short compared to the length of the idle periods the inaccuracy will become quite small. Using the always-on connection idle time period for billing purposes is the preferred solution since it is more accurate.

The generated billing information for the user of the always-on connection may be stored together with other received charging session related data 9-6. A reporting function 9-7 can then access the stored billing/charging information for generating for example the monthly user bills and various reports for the network operator. Further on the storing means might be accessed to provide the information which is required by law to be stored in relationship to data connections.

As visible from the figures and their description CDR generation is reduced (or even stopped) during the detected idle period(s) of the always-on connection, which result in a reduced network load because less CDRs are transmitted to the billing domain. Further on the amount of charging related information to be stored (as required by national law) is reduced by the invention. The advantage of the invention increases proportional with the number of always-on connections and with the amount/length of idle periods occurring on those always-on connections.

The term "suspending a charging session" and equivalent terms used in this application does not mean that no charging related data is generated and transferred for the always-on connection where the suspended charging session belongs to. As outlined in the description Charging Data Records might be even generated and transferred during periods where the charging session is suspended (for example for triggers that are not suppressed). Those not suppressed charging triggers, and the resulting generated CDRs, do not change the idleness status of the always-on connection nor do they change the suspended status of the belonging charging session. This can be compared to the idle detection process where "special data" like ICMP, polling and keep alive-messages may be ignored and its occurrence on the always-on connection does not change the idleness of the always-on connection.

As a further option of the present invention an open CDR might not be closed when a charging session is suspended. Instead only the open container of the CDR might be closed and no new container is opened right away. Also for this option the charging session is and remains suspended, even if there is still an open CDR. The suspending of the charging session may end only if this is indicated (for example by charging session continued indication in a CDR). If the CDR is not closed when a charging session is suspended also the opening time for a container must be indicated in a container field, since the opening time of a container is no longer the closing time of the previous container or the opening time of the CDR.

Functions of a charging function in a network or billing domain node as described above may be implemented by code means, as software, and loaded into memory of a computer.

It is to be noted that any time aspects indicated in FIGS. 1 to 9 do not necessarily restrict any one of the steps shown to the step sequence outlined. This applies in particular to method steps that may be functionally disjunctive with each other.

Although the present invention has been described herein before with reference to particular embodiments thereof, the present invention is not limited thereto and various modification can be made thereto.

Used Abbreviations:

| | |
|---|---|
| 3GPP | 3$^{rd}$ Generation Partnership Project |
| ASN GW | Access Service Network Gateway |
| BD | Billing Domain |
| BNG | Broadband Network Gateway |
| BRAS | Broadband Remote Access Server |
| BSS | Billing Support System |
| CDF | Charging Data Function |
| CDR | Charging Data Record |
| CGF | Charging Gateway Function |
| CGI | Cell Global Identifier |
| CTF | Charging Trigger Function |
| GGSN | Gateway GPRS Support Node |
| GPRS | General Packet Radio Service |
| I | ICMP message |
| ICMP | Internet Control Message Protocol |

-continued

| ISP | Internet Service Provider |
| K | Keep alive message |
| LTE | Long Term Evolution |
| MGW | Media Gateway |
| OCS | Online Charging System |
| P | Polling message |
| PDG | Packet Data Gateway |
| PDP | Packet Data Protocol |
| PDSN | Packet Data Switching Node |
| PGW | Packet Data Network Gateway |
| QoS | Quality of Service |
| RAI | Routing Area Identity |
| SAE | System Architecture Evolution |
| SAI | Service Area Identifier |
| SGSN | Serving GPRS Support Node |
| SGW | Serving Gateway |
| UD | User Data |
| UE | User equipment |
| UMTS | Universal Mobile Telecommunications System |
| WLAN | Wireless Local Area Network |

The invention claimed is:

1. A method of charging a subscriber in a communication network for an always-on connection, the method which comprises:
   upon creating the always-on connection, starting a charging session;
   detecting whether or not the always-on connection is idle; and
   if the always-on connection is idle, suspending the charging session related to the always-on connection without terminating the charging session.

2. The method according to claim 1, wherein the suspending step comprises reducing a generation of charging data for the always-on connection during an idle period thus detected.

3. The method according to claim 1, wherein the suspending step comprises closing a currently open Charging Data Record and not opening a new Charging Data Record for the charging session related to the always-on connection when a start of an idle period is detected.

4. The method according to claim 1, which comprises, upon starting a suspension of the charging session, generating at least one indicator selected from the group consisting of a charging session suspended information, a time-stamp when the suspending of the charging session is started, and a time-stamp when the always-on connection became idle.

5. The method according to claim 1, wherein the step of detecting whether the always-on connection is idle comprises:
   finding that no data is present on the always-on connection for a defined time period; and
   thereby ignoring special data present on the always-on connection related to monitoring and controlling the always-on connection or data related to monitoring and controlling applications running over the always-on connection.

6. A method of charging a subscriber in a communication network for an always-on connection, the method which comprises:
   upon creating the always-on connection, starting a charging session;
   extracting information from received charging data related to the always-on connection; and
   detecting from the information thus extracted whether or not the charging session related to the always-on connection is suspended.

7. The method according to claim 6, which comprises calculating, with the aid of the information thus extracted, at least one of a time period where the always-on connection was idle and a time period where a charging session related to the always-on connection was suspended.

8. An apparatus for charging a subscriber for an always-on connection in a communication network, the apparatus comprising:
   a charging device configured to initiate a charging session in response the always-on connection being created;
   an idle detecting device configured to detect whether or not the always-on connection is idle; and
   a suspending device configured to suspend the charging session related to the always-on connection if the always-on connection is idle without terminating the charging session.

9. The apparatus according to claim 8, wherein said suspending device initiates a reduction of charging data generated for the always-on connection during a detected idle period.

10. The apparatus according to claim 9, wherein the reduction of charging data comprises suppressing at least one charging trigger causing a generation of Charging Data Records related data.

11. The apparatus according to claim 8, wherein said suspending device is configured to initiate a closing of an open Charging Data Record without opening a new Charging Data Record for the always-on connection when a start of an idle period is detected.

12. The apparatus according to claim 8, wherein, when suspending of the charging session starts, an indication is generated including at least one of a time-stamp when the suspending of the charging session is started, and a time-stamp when the always-on connection became idle.

13. The apparatus according to claim 8, wherein, when suspending of the charging session ends, an indication is generated including at least one of a charging session continued information and a time-stamp when a continuation of the charging session is started.

14. The apparatus according to claim 8, wherein said idle detecting device is configured to detect whether or not the always-on connection is idle by:
   checking that no data on the always-on connection is present for a defined time period; and
   ignoring, during the checking, special data present on the always-on connection, the special data being data related to monitoring and controlling the always-on connection or data related to monitoring and controlling of applications running over the always-on connection.

15. The apparatus according to claim 8, wherein the charging session is one of an offline charging session or an online charging session.

16. An apparatus for charging a subscriber for an always-on connection in a communication network, the apparatus comprising:
   a charging device configured to initiate a charging session in response the always-on connection being created;
   an extracting device configured to extract information from received charging data related to the always-on connection; and
   a detecting device configured to detect from the information thus extracted whether or not the charging session related to the always-on connection is suspended.

17. The apparatus according to claim 16, wherein the information thus extracted includes at least one indication selected from the following:

whether the charging session is suspended, a time-stamp when the suspending of the charging session is started, a time-stamp when the always-on connection related to the charging session became idle, an indication if the charging session is continued, and a time-stamp when the continuation of the charging session is started.

18. The apparatus according to claims 16, which further comprises a calculating device configured to calculate from the information extracted by said extraction device at least one of a time period when the always-on connection was idle and a time period when the charging session related to the always-on connection was suspended.

19. The apparatus according to claim 18, which further comprises a billing device configured not to bill a user of the always-on connection for at least one of the calculated time periods.

20. The apparatus according to claim 16, wherein the charging session is one of an offline charging session or an online charging session.

21. A communication system with apparatus for charging a subscriber for an always-on connection, comprising:
- a charging device configured to initiate a charging session in response the always-on connection being created;
- an idle detecting device configured to detect whether or not the always-on connection is idle;
- a suspending device configured to suspend a charging session related to the always-on connection if the always-on connection is idle without terminating the charging session;
- an extracting device configured to extract information from received charging data related to the always-on connection; and
- a detecting device configured to detect from the information thus extracted whether or not the charging session related to the always-on connection is suspended.

22. A computer program product, comprising code means stored in non-transitory form and adapted to implement the following method steps for suspending a charging session of an always-on connection in a communication network when loaded into a memory of a computer:
- upon creating the always-on connection, starting a charging session;
- detecting whether or not the always-on connection is idle;
- if the always-on connection is idle, suspending a charging session related to the always-on connection without terminating the charging session;
- extracting information from received charging data related to the always-on connection; and
- detecting from the information thus extracted whether or not the charging session related to the always-on connection is suspended.

* * * * *